Figure 1:
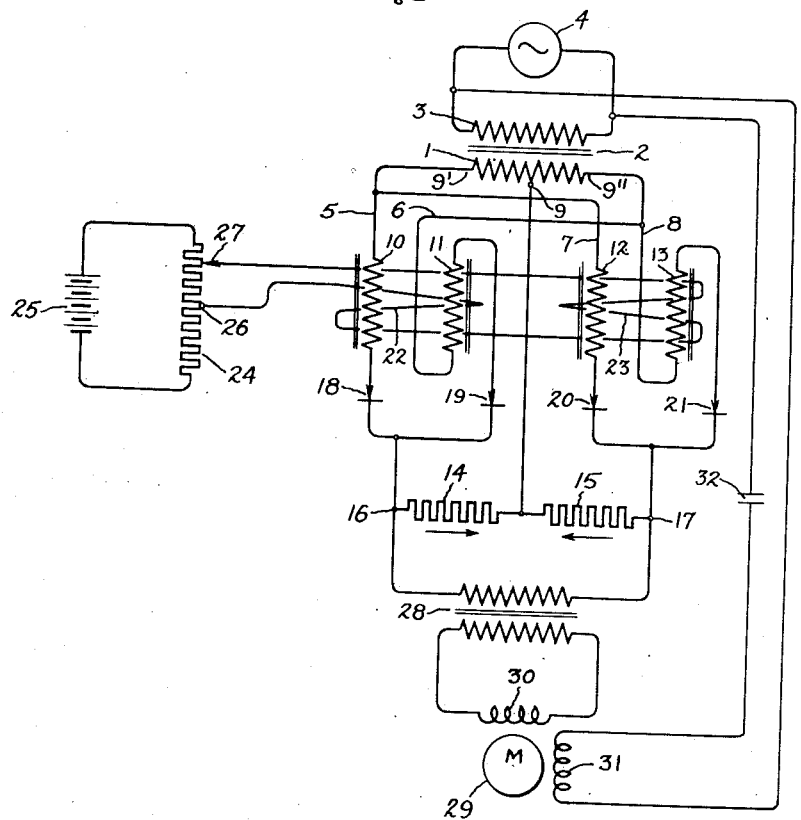

Inventors:
Hugh M. Ogle,
Charles N. Hood, II
by Paul A. Frank
Their Attorney.

United States Patent Office 2,768,345
Patented Oct. 23, 1956

2,768,345

MAGNETIC AMPLIFIER CIRCUIT

Hugh M. Ogle and Charles N. Hood II, Schenectady, N. Y., assignors to General Electric Company, a corporation of New York Application March 1, 1950, Serial No. 146,954

9 Claims. (Cl. 323—89)

Our invention relates to magnetic saturation controlled electric amplification systems, commonly called "magnetic amplifiers," and, more particularly, to such magnetic amplifiers as may be employed to produce a reversible control of the operation of an electric load device.

In many industrial applications, it is desired to control both the magnitude and direction of operation of an electric load device in accordance with either a small alternating or unidirectional signal voltage. If the load device to be controlled is responsive to an energizing unidirectional electric current, both the amplitude and polarity of this energizing unidirectional current must be controlled in order to obtain a desired adjustment of the magnitude of load excitation as well as to obtain a reversal in the direction of operation of the device. Similarly, if the load device is responsive to alternating current, control over both the amplitude and phase or "sense" of the alternating current therethrough is necessary in order to obtain a similar control action over both the magnitude and direction of operation of the alternating current load device.

Accordingly, a principal object of our invention is to provide a magnetic amplifier circuit for electric control systems which may be connected to provide either a phase-sensitive alternating voltage output or a reversible polarity unidirectional voltage output when excited by either an alternating phase discriminatory signal voltage or a reversible polarity unidirectional signal voltage.

Another object of our invention is to provide a highly sensitive magnetic amplifier circuit whereby the amplitude and polarity of a unidirectional current through a direct current load device can be amplified and controlled in accordance with the amplitude and phase of a small alternating signal voltage.

A further object of our invention is to provide a highly sensitive magnetic amplifier circuit whereby the amplitude and phase of an alternating current through an alternating current load can be amplified and controlled in accordance with the amplitude and polarity of a small unidirectional signal voltage.

A still further object of our invention is to provide a magnetic amplifier circuit which may be connected in cascade to provide highly sensitive control over the amplitude and phase of an alternating current through an alternating current load device in accordance with the amplitude and phase of a small alternating signal voltage, or to provide highly sensitive control over the amplitude and direction of a unidirectional current through a direct current load device in accordance with the amplitude and polarity of a small unidirectional signal voltage.

In general, the magnetic amplifier circuit of our invention comprises two pairs of electric current paths adapted to be connected from a common zero voltage terminal of an alternating voltage source to each side of the alternating voltage source. Each current path includes a saturable reactance winding and a current rectifying element whereby current flows alternately through each path of each pair of current paths during alternate half cycles of source voltage. A pair of control windings magnetically coupled to these reactance windings are connected in series flux opposition and cause the current in each conduction path to vary either directly or inversely in a predetermined manner in accordance with a signal voltage applied to the control windings. The output voltage of the circuit is taken across a pair of substantially identical impedances respectively connected in series with each pair of electric conducting paths and comprises the differential of the voltage produced across each impedance. The direction of the flux produced by the saturable reactance windings with relation to the flux produced by the control windings is such that if a unidirectional signal voltage is supplied to the control windings, an amplified alternating output voltage is produced whose amplitude and phase sense is dependent upon the amplitude and polarity of this unidirectional signal voltage. Conversely, an alternating signal voltage derived from the alternating voltage source and supplied to the control windings produces an amplified unidirectional current in the output load device whose amplitude and polarity are dependent upon the amplitude and phase sense of this alternating signal voltage. When this magnetic amplifier is used to produce an alternating current output, a unidirectional component may be produced across output terminals. This unidirectional component may be eliminated by the use of a transformer, or other suitable means, or may be employed as a biasing voltage in a further stage of magnetic amplification in a manner well known in the art.

The novel features which we believe to be characteristic of our invention are set forth with particularity in the appended claims. Our invention itself, however, together with further objects and advantages thereof can best be understood by reference to the following description taken in connection with the accompanying drawings in which Fig. 1 is a circuit diagram of a control system embodying our invention wherein an alternating current load device is controlled by a unidirectional signal voltage, and Fig. 2 is a circuit diagram of a control system embodying our invention whereby a direct current load device is controlled by an alternating signal voltage.

Figure 2:
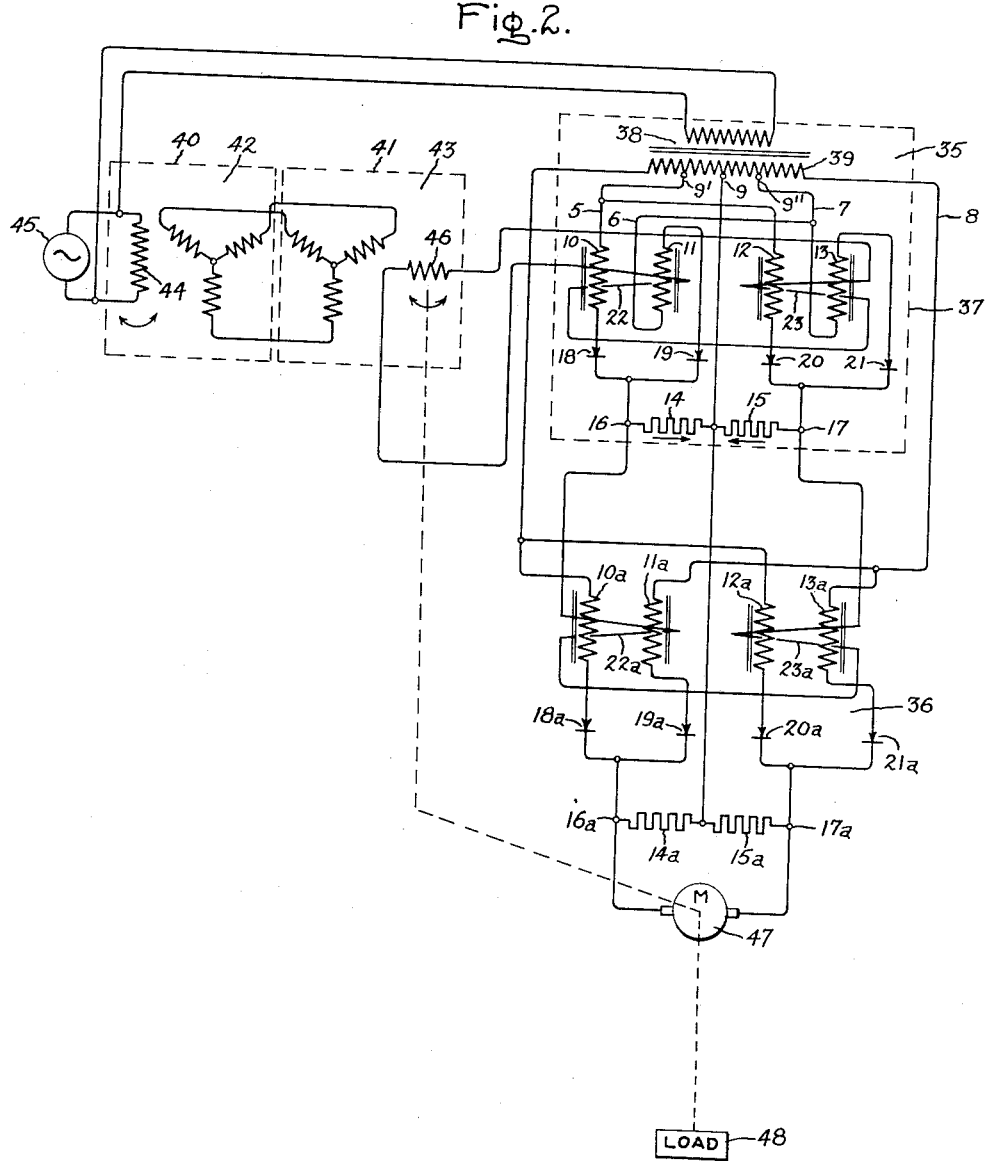

Referring to Fig. 1, we have shown a control system embodying our invention as a phase-sensitive amplifier wherein an alternating output voltage is produced which varies in accordance with the amplitude and polarity of a small unidirectional signal voltage. The magnetic amplifier itself is energized by a connection to a three terminal source of alternating voltage having a zero-voltage terminal and two opposite-phase alternating voltage terminals such as may be provided by a center-tapped secondary winding 1 of a transformer 2 whose primary winding 3 is connected across a source of single phase alternating voltage 4. Alternatively, two separate transformers may be used and one terminal of each interconnected or grounded to form a common zero-voltage point or terminal. Two pairs of electric current conducting paths, indicated generally by numerals 5, 6 and 7, 8, are respectively connected from the common zero-voltage terminal, such as a center-tap 9 of the transformer secondary winding 1, to opposite-phase voltage terminals of the three terminal source, such as opposite sides 9' and 9" of the transformer secondary winding 1; each path of each pair thereof being connected to opposite terminals. Each of four preferably identical reactance windings 10, 11, 12 and 13, wound upon separate magnetically saturable core members or upon separate legs of a common magnetically saturable core member, is included in a respective one of these electric conducting paths; and separate similarly poled current rectifying members 18, 19, 20 and 21 are also respectively connected in series circuit relation with each path and function to cause the current to flow alternately through each path of each pair thereof during alternate half cycles of source voltage. In the drawing, reactance windings designated by numerals 10 and 11 are respectively included in one such pair of conducting paths, and reactance windings designated by numerals 12 and 13 are respectively included in the other pair thereof. A pair of substantially identical impedances 14 and 15 are respectively connected in series with each pair of current conducting paths and are preferably connected from separate corresponding impedance points 16 and 17, common to each pair of current paths respectively, to the zero-voltage terminal 9. The output voltage of this magnetic amplifier circuit is taken across these impedances 14 and 15 at the corresponding impedance points 16 and 17 which preferably also comprise the output terminals of the circuit.

In order to produce a proper phase discriminatory action, as will be more fully explained hereinafter, the reactance windings in each pair of current paths are constructed and connected so as to produce oppositely directed flux during their respective current conducting periods relative to the saturation control means of the reactance winding reactors. In the drawings, we have shown these reactance windings as being reversely connected in their respective paths. It is evident that, alternatively, the connections may be the same but the direction of winding of these reactance windings may be reversed with relation to each other.

In order to control the magnitude of current conduction in each path during its respective conducting period, saturation control means such as control windings 22 and 23 are wound in magnetic circuit relation with each pair of reactance windings 10, 11 and 12, 13, respectively. The control windings 22 and 23 are connected in series and relatively constructed so as to produce oppositely directed flux having opposite saturation effect upon each associated pair of reactance windings when an electric current flows through the control windings. In the drawings, this relation is diagrammatically illustrated by a reversed connection of the control windings although a reversal of the direction of the reactance windings themselves may, of course, be employed to produce this same desired flux relation.

A unidirectional voltage which is adjustable in amplitude and reversible in polarity is supplied to the control windings by such means as a potentiometer 24 connected across a unidirectional voltage source 25 and having a fixed center-tap 26 and an adjustable tap 27. The control windings 22 and 23 are connected to receive the voltage developed between these two taps of the potentiometer 24.

The alternating voltage output of this control system is taken from the output terminals 16 and 17 and supplied through a transformer 28 to an alternating current load device 29, shown as a reversible alternating current motor having two field windings 30 and 31. One of the field windings 30 is connected across the secondary winding of transformer 28 while the other field winding 31 is connected through a phase shifting capacitor 32 across the alternating current source 4. The transformer 28 functions primarily to eliminate from the transformer secondary winding circuit any unidirectional component of alternating voltage which may be produced across the output terminals 16 and 17 of the magnetic amplifier circuit and which is supplied to the primary winding of the transformer 28. In some applications, this unidirectional component may serve a useful purpose in the load device in which case the decoupling transformer or such other decoupling device need not be used. The output of the magnetic amplifier may be employed, for example, to drive the control winding of an additional stage of magnetic amplification, in which case the unidirectional component of the output voltage may be utilized as a flux biasing voltage in conjunction with the alternating signal voltage produced thereby.

In the operation of this phase-sensitive magnetic amplifier, during one-half cycle of source voltage, such as the positive half-cycle thereof, current flows through the conducting path including reactance winding 10, rectifier 18 and impedance 14, as well as the path comprising the reactance winding 12, rectifier 20 and impedance 15. During the succeeding half-cycle of source voltage, such as the negative half-cycle thereof, current flows through the conducting path comprising reactance winding 11, rectifier 19 and impedance 14 as well as the path comprising reactance winding 14, rectifier 21 and impedance 15. If a unidirectional voltage is supplied across the series connected control windings 22 and 23, the resultant control flux accelerates the saturation of one reactor in each controlled pair of reactors while it retards the saturation of the other reactor thereof during the alternate conducting periods of their associated reactance windings. However, since one control winding is reversely connected or wound with respect to the other control winding, a unidirectional current therethrough functions to produce a reversed controlled action in each pair of alternately conducting paths. Assuming that a positive signal voltage supplied across the control windings 22 and 23 causes an acceleration of the saturation of the reactor associated with winding 10, then it will also cause a retardation of the saturation of the reactor associated with winding 12, which reactor is energized together with reactor 10 during the same alternation of source voltage. During the succeeding alternation of source voltage, reactance windings 11 and 13 will operate to energize their associated reactors, but the positive signal voltage produced control flux will now cause an acceleration of the saturation of the reactor associated with winding 13 while it causes a corresponding retardation of the saturation of the reactor associated with winding 11. Since impedance elements 14 and 15 are respectively connected in series with each controlled pair of reactance windings, a greater current flows in one impedance than in the other during source voltage alternations of one polarity such as positive, but the preponderance of current flow reverses during source alternations of an opposite polarity, such as negative.

Due to the similarly poled rectifiers 18, 19, 20 and 21, the direction of current flow through the impedances 14 and 15 is always in opposition to each other as indicated by the arrows in Fig. 1, and the magnitude and direction of the current in the alternating current load device connected across these output terminals 16 and 17 is, therefore, dependent upon the magnitude and direction of the voltage differential between the voltages developed across the separate impedances 14 and 15. As a result, an alternating voltage appears across terminals 16 and 17.

The magnitude of this alternating voltage is, of course, dependent upon the amplitude of the unidirectional control voltage supplied to the control winding. A greater control voltage functioning to increase the voltage difference between each conducting path in each pair thereof during each alternation, and thereby to produce a higher amplitude alternating voltage output.

In addition, the phase or "sense" of this alternating voltage output relative to the phase of the alternating source voltage is dependent upon the polarity of this unidirectional control voltage. If a positive control voltage enables a greater current to pass through reactance winding 10, than through reactance winding 12, then a negative control voltage will reverse this preponderance of current flow. A corresponding reversal of preponderance of current flow in response to a reversal in unidirectional signal polarity occurs through reactance windings 11 and 13 during their respective conducting periods. Since impedances 14 and 15 are connected in series with each pair of current paths, a corresponding reversal in the direction of the voltage difference produced across these impedances results; and a negative control voltage supplied across the control windings 22 and 23 produces an alternating voltage across the output terminals 16 and 17 which is 180 degrees out-of-phase with the alternating voltage which is produced with a positive control voltage.

When this control system is employed with a reversible alternating current motor 29, as illustrated in Fig. 1, this alternating voltage of reversible phase is applied across a main control field winding 30 of the motor while a secondary field winding 31 is energized by connection to the alternating voltage source 4 through the capacitor 32. This capacitor 32 functions to shift the phase of this secondary field by approximately 90 degrees, and the secondary field of winding 31 is, therefore, always approximately 90 degrees out-of-phase with the control field due to winding 30. The phase of this control field is compared in the motor against the phase of this secondary field, and a reversal of control field phase causes a reversal in the direction of the motor, in a manner well known in the art.

Referring to Fig. 2, we have shown our invention in conjunction with a control system employing an alternating control signal voltage to produce a phase discriminating reversible polarity unidirectional output voltage. In this control system, a magnetic amplifier in accordance with our invention is employed to control the position of a mechanical load to correspond to the position of a remote alternating current control device. Two or more stages of magnetic amplification, such as indicated generally by numerals 35 and 36, respectively, are preferably employed. The first stage of magnetic amplification 35, enclosed in dashed line 37, is substantially identical to the magnetic amplifier of Fig. 1, corresponding elements being designated by similar reference numerals. However, the three terminal tapped secondary winding power transformer 2 of Fig. 1 is preferably replaced by a transformer 38 having a five terminal tapped secondary winding 39 in the magnetic amplifier 35 of Fig. 2 so that both stages of magnetic amplification designated by numerals 35 and 36 may be driven by one transformer 38.

The control windings 22 and 23 of the magnetic amplifier 35 are energized by an alternating signal voltage derived from a selsyn type generator and control transformer apparatus enclosed within dashed lines 40 and 41 and indicated generally by the numerals 42 and 43 respectively. A manually controlled reversely rotatable rotor winding 44 of the selsyn generator 42 is connected across an alternating voltage source 45 and induces a voltage in a reversely rotatable rotor winding 46 of the selsyn control transformer 43. As is well known, the amplitude and phase sense of this induced voltage varies in accordance with the position of the generator rotor winding 44. The control transformer rotor winding 46 is connected in series circuit relation with the control windings 22 and 23 and serves to supply this phase sensitive control voltage thereto. The rotational position of this control transformer rotor winding 46 is, however, mechanically connected to be controlled by a direct current reversible motor 47 as indicated by connecting dashed line 47'. Motor 47 is, in turn, electrically connected to be energized by the output of the second stage of magnetic amplification 36, as will be more fully described below. In addition to driving the selsyn generator, this motor 47 is also mechanically connected to a load designated as block 48.

The second stage of magnetic amplification 36, is constructed in a manner similar to the first stage of magnetic amplification 35 and corresponding elements have been designated by similar reference numerals followed by the distinguishing letter "a." However, the separately controlled pairs of reactance windings 10a, 11a, and 12a, 13a which are controlled by separate control windings 22a and 23a respectively, are wound and connected in the same direction rather than reversely wound and connected as indicated in the first stage of magnetic amplification 35. Consequently, a unidirectional voltage of given polarity supplied to the series connected control windings 22a and 23a, produces an amplified unidirectional voltage of corresponding polarity across output terminals 16a and 17a, as will be more fully explained hereinafter.

The unidirectional voltage output of the first stage of magnetic amplification 35 is taken across terminals 16 and 17 and supplied to the series connected and reversed control windings 22a and 23a of the second stage of magnetic amplification 36. The resultant amplified unidirectional output voltage of the second stage of magnetic amplification 36 is taken across corresponding output terminals 16a and 17a and is connected to energize the reversible direct current motor 47.

In the operation of the circuit of Fig. 2, the alternating voltage induced in the rotor winding 46 of the selsyn control transformer 43 and supplied to the control windings 22 and 23 is either in-phase or 180 deg. out-of-phase with the alternating source voltage 45 depending upon the direction of deviation of the selsyn generator rotor winding 44 relative to the control transformer rotor winding 46. The amplitude of this induced alternating voltage depends, of course, upon the degree of deviation therebetween. Because of the alternating character of the control signal, the flux in each pair of controlled reactors 10, 11, and 12, 13 due to the current in the control windings 22 and 23 reverses direction upon each alternation of signal voltage. In addition, due to the reversal of the reactance windings comprising each controlled pair, the flux due to the current conduction therethrough is also oppositely directed during their respective alternate conducting periods. Furthermore, since both the reactance windings and the control windings are ultimately energized by the same alternating voltage source 45, the frequency of reversal of control winding flux and reactance winding flux is inherently synchronized. With an in-phase control voltage condition, one pair of controlled reactance windings always passes a greater current on both alternations of supply voltage polarity than the other pair of controlled reactance windings, and a unidirectional differential voltage of a particular polarity appears across impedances 14 and 15. Similarly, with a 180 deg. out-of-phase control voltage condition, the preponderance of permissive current flow shifts to the other pair of controlled reactance windings and a unidirectional differential voltage of opposite polarity is developed across impedances 14 and 15.

More specifically, if an induced signal voltage in control transformer rotor winding 46 which is in-phase with the alternating voltage source 45 produces a control flux in control windings 22 and 23 which aids the flux produced by the reactance winding 10 and opposes the flux produced by the reactance winding 12 during a positive alternation of supply voltage to produce a preponderance of current flow through impedance 14 over impedance 15, then the control flux produced by this in-phase alternating signal voltage also aids the flux produced by the reversed reactance winding 11 and opposes the flux produced by the reversed reactance winding 13 during the negative alternation of supply voltage to produce a similar preponderance of current flow tthrough impedance 14 over impedance 15. Consequently, the voltage appearing across terminals 16 and 17 always has the same polarity upon an in-phase alternating signal voltage excitation and the magnitude of this unidirectional output voltage depends upon the amplitude of the alternating voltage signal. A 180 deg. out-of-phase signal voltage condition only serves to reverse this control action, with the result that reactance windings 12 and 13 always pass more current than reactance windings 10 and 11 during their respective conducting periods, and the preponderance of current flow shifts so that more current flows through impedance 15 than through impedance 14 during both alternations of supply voltage. A unidirectional voltage across terminals 16 and 17 is thereby produced which is of opposite polarity to that produced with an in-phase alternating current signal.

This unidirectional reversible polarity output voltage appearing across terminals 16 and 17 of magnetic amplifier 35 is supplied across the series connected and reversed control windings 22a and 23a of the second stage of magnetic amplification 36. However, since the reactance windings of each controlled pair of reactance windings in this magnetic amplification stage 36, are not reversed with respect to each other, the unidirectional control voltage functions to produce a corresponding unidirectional output voltage across terminals 16a and 17a rather than an alternating voltage output as would be produced if the reactance windings were reversed in the manner indicated in the circuit of Fig. 1. Assuming that the polarity of the unidirectional voltage supplied to the control winding is such as to enable reactance winding 10a to pass more current during positive alternations of source voltage than is passed by reactance winding 12a, then the reactance winding 11a will also pass more current than reactance winding 13a during negative alternations of source voltage. As a consequence, a greater current always flows through impedance 14a than through impedance 15a and an amplified unidirectional voltage appears across terminals 16a and 17a. A reversal of polarity of the unidirectional signal voltage functions to reverse the polarity of the unidirectional output voltage.

Since the direct current reversible motor 47 is energized by the output of this second stage of magnetic amplification, its speed and direction of rotation depends, of course, upon the amplitude and polarity of the unidirectional signal voltage applied to this second stage of magnetic amplification and, therefore, ultimately depends upon the amplitude and phase of the alternating voltage supplied to the control windings of the first stage of magnetic amplification 35.

However, since the control transformer rotor winding 46 is also driven by the motor 47, the motor 47 will continue to operate only until the relative positions of the selsyn generator rotor winding 44 and the control transformer rotor winding 46 are such that the induced alternating voltage is reduced to zero. When no alternating signal voltage is supplied to the control windings 22 and 23, the currents flowing through impedances 14 and 15 are equal so that no differential voltage is developed across output terminals 16 and 17 and the motor 47 stops. The load device 48 is, therefore, rotated in accordance with the position of the reversely rotatable control rotor winding 44 of the selsyn generator 42, and the direction of motion is in a predetermined direction depending upon the direction of deviation of the generator rotor winding 44 with respect to the control transformer winding 46.

It will be appreciated that when this magnetic amplifier circuit is employed with an alternating voltage signal, the control windings 22 and 23 need only have a small ohmic resistance in order to produce a relatively high alternating current impedance sufficient to prevent loading of the signal source. This is of particular importance since many alternating current sources are capable of supplying only very small currents. Furthermore, the input impedance of the control windings 22 and 23 is therefore not appreciably affected by variations in load impedance or in supply voltage and, hence, the unit may be used successfully in many different applications.

While we have shown only two embodiments of our invention in order to fully describe the operation of our novel magnetic amplifier circuit with either alternating signal excitation to produce a reversible unidirectional output voltage or with a unidirectional signal excitation to produce an alternating phase-sensitive voltage output, it is evident that magnetic amplifiers in accordance with our invention may be connected in cascade to produce either type output with either type of signal excitation. If it is desired to produce an amplified reversible polarity unidirectional output voltage with a unidirectional reversible polarity signal voltage, the output phase-sensitive alternating voltage of a first unidirectional signal voltage controlled stage need only be connected to energize the control windings of a second similarly connected stage whose output voltage will be unidirectional and of reversible polarity. A similar cascade connection may be employed to produce an amplified phase-sensitive alternating voltage output with a phase-sensitive alternating signal voltage.

Since a push-pull type of amplification is produced by our magnetic amplifier circuit, the sensitivity of this circuit is much greater than that normally produced in conventional magnetic amplifier circuits. In addition, the magnetic amplifier circuit described above, enables a very definite reversible control action which has heretofore been difficult to achieve in magnetic amplifier circuitry.

Although we have shown particular embodiments of our invention, many modifications may be made and will occur to those skilled in the art. It is to be understood, therefore, that we intend by the appended claims to cover all such modifications as fall within the true spirit and scope of our invention.

What we claim as new and desire to secure by Letters Patent of the United States is:

1. A magnetic amplifier circuit comprising a transformer adapted to be connected to an alternating voltage source and having a center tapped secondary winding, circuit means providing first and second pairs of electric conducting paths from said center tap of said transformer secondary winding to opposite sides of said secondary winding, each pair of said paths including a separate series connected impedance of a pair of impedances, and each one of said paths including a saturable reactor reactance winding and a current rectifying member for limiting the current conduction to flow alternately through each path of each pair thereof during respective opposite polarity half cycles of said alternating voltage source, output terminal means connected to said impedances to provide the difference in voltage developed across said impedances, and a pair of control windings each arranged in magnetic circuit relation with the reactance windings included in one of said first and second pairs of current paths, said control windings being interconnected in series circuit relation and arranged to produce oppositely directed flux relative to the reactance windings that conduct simultaneously when an electric current flows through said control windings, and each pair of reactance windings controlled by one control winding being constructed and connected in their respective paths to produce oppositely directed flux relative to their associated control winding during their respective conducting periods.

2. In combination, a source of alternating voltage having a zero voltage terminal and two oppositely phased alternating voltage terminals, circuit means providing a first pair of electric current paths from said zero voltage terminal to each of said alternating voltage terminals and a second pair of electric current paths from said zero voltage terminal to each of said alternating voltage terminals, each of said paths including a respective one of four saturable reactor reactance windings and a respective one of four similarly poled electric current rectifying members, a pair of impedances each included in one respective pair of said current paths, a load device of the type adapted to be energized by a unidirectional reversible polarity voltage connected across said pair of impedances, means for deriving an alternating signal voltage from said alternating voltage source which is adjustable in magnitude and reversible in phase, and a pair of series connected control windings each respectively associated in magnetic circuit relation with one pair of reactance windings included in one of said first and second pairs of conducting paths and connected to be energized by said alternating signal voltage, said control windings being constructed and connected to have opposite saturation effect upon the reactance windings that conduct during the same half-cycle of source voltage, and each control winding being constructed and connected to have oppositely directed magnetic coupling with its associated pair of reactance windings.

3. In combination, a source of alternating voltage having a zero voltage terminal and two oppositely phased alternating voltage terminals, circuit means providing a first pair of electric current paths from said zero voltage terminal to each of said alternating voltage terminals and a second pair of electric current paths from said zero voltage terminal to each of said alternating voltage terminals, a pair of impedances each included in one respective pair of said current paths, a load device of the type adapted to be energized by an alternating voltage of reversible phase connected across said pair of impedances, magnetic saturation current controlling means including four reactance windings, a respective one of said reactance windings being included in each current path, similarly poled current rectifying means included in each current path, means for providing a unidirectional voltage which is adjustable in magnitude and reversible in polarity, and a pair of series connected control windings each respectively associated in magnetic circuit relation with one pair of reactance windings included in one of said first and second pairs of current paths and connected to be energized by said unidirectional signal voltage, said control windings being constructed and connected to produce oppositively directed instantaneous flux relative to the reactance windings that conduct during the same half-cycle of source voltage, and each two reactance windings controlled by one control winding being constructed and connected to produce oppositely directed flux relative to their associated control winding during their respective alternate conducting periods.

4. A magnetic amplifier circuit comprising a transformer adapted to be connected to an alternating voltage source and having a tapped secondary winding, circuit means providing first and second pairs of electric conducting paths from said secondary winding tap to opposite sides of said secondary winding, each pair of said paths including a different impedance and each one of said paths including a saturable reactor reactance winding and a current rectifying member for limiting current conduction to flow alternately through different paths of each pair thereof during respective opposite polarity half-cycles of said alternating voltage source, conductors connected to said impedances for providing the difference in voltage developed across said impedances, and saturation control means arranged in magnetic circuit relation with said reactance windings to have opposite saturation effect upon the reactance windings conductive during the same polarity half-cycles of source voltage and to have oppositely directed magnetic coupling with the reactance windings included in each said first and second pairs of current paths.

5. A magnetic amplifier circuit comprising three alternating voltage input terminals, a pair of output terminals, separate impedances respectively connected from each output terminal to one input terminal, saturable reactor means including four reactance windings and saturation control winding means, a first pair of said reactance windings being respectively connected from each of the other two input terminals to one output terminal and a second pair of said reactance windings being respectively connected from each of said other two input terminals to the other output terminal, and rectifying means connected in circuit with each reactance winding and polarized to pass current in the same direction between said input and output terminals, said saturation control winding means being magnetically coupled in oppositely directed flux relation to each of the simultaneously conducting reactance windings connected to the same input terminals and to each of the alternately conducting reactance windings connected to the same output terminals.

6. A magnetic amplifier circuit comprising a transformer having a tapped secondary winding, a pair of output conductors, saturable reactor means including a first pair of reactance windings each connected from an opposite side of said secondary winding to one output conductor and a second pair of reactance windings each connected from an opposite side of said secondary winding to the other output conductor, separate impedances connected between each output conductor and the tap of said secondary winding, separate similarly poled rectifiers connected in circuit relation with each reactance winding to enable simultaneous current conduction alternately through different reactance windings of each said first and second pairs thereof, and a pair of interconnected saturation control windings each magnetically coupled with a different one of said first and second pairs of reactance windings, said control windings being constructed and connected to have opposite saturation effect upon the simultaneously conducting reactance windings, and each pair of said first and second reactance winding pairs being constructed and connected to produce oppositely directed flux relative to their associated control winding during their respective conductive periods.

7. In combination, a transformer adapted to be connected to an alternating voltage source and having a tapped secondary winding, circuit means providing first and second pairs of electric conducting paths from said secondary winding tap to opposite sides of said secondary winding, each pair of said paths including a different impedance and each one of said paths including a saturable reactor reactance winding and rectifying means for limiting current conduction to flow alternately through different paths of each pair thereof during respective opposite polarity half-cycles of said alternating voltage source, a load device of the type energizable by a reversible-polarity unidirectional voltage connected to receive the difference in voltage developed across said impedances, saturation control means magnetically coupled with said reactance windings and arranged to have opposite saturation effect upon the simultaneously conducting reactance windings and to have oppositely directed magnetic coupling with the alternately conducting reactance windings in each said first and second pairs thereof, and means for energizing said saturation control means with a reversible-phase alternating signal derived from said alternating voltage source.

8. In combination, a transformer adapted to be connected to an alternating voltage source and having a tapped secondary winding, a pair of output conductors, a load device of the type energizable by a unidirectional, reversible-polarity voltage connected between said output conductors, a separate impedance connected from each output conductor to the tap of said secondary winding, saturable reactor means having four reactance windings and saturation control windings, a first pair of said reactance windings being respectively connected from opposite sides of the secondary winding to one output conductor, a second pair of said reactance windings being respectively connected from opposite sides of said secondary winding to the other output conductor, a different similarly poled rectifier connected in series with each reactance winding to limit current conduction to flow alternately through different reactance windings of each said pair thereof during respective opposite polarity half-cycles of said alternating voltage source, means connected between said voltage source and said control windings for supplying to said control winding a reversible-phase alternating signal voltage derived from said alternating voltage source, said control windings being arranged to have opposite instantaneous magnetic saturation effect upon the reactance windings that conduct during the same half-cycle of source voltage, and the reactance windings of each said first and second pairs of reactance windings being arranged to have oppositely directed magnetic coupling with said control windings during their alternately conductive periods.

9. In combination, a first transformer adapted to be connected to an alternating voltage source and having a center tapped secondary winding, a pair of output conductors, a second transformer connected across said output conductors, a separate impedance connected from each output conductor to said secondary winding center tap, saturable reactor means having four reactance windings and saturation control means, a first two of said four reactance windings being connected respectively from each of the two ends of said secondary winding to one of said output conductors and a second two of said four reactance windings being respectively connected from each of the two ends of said secondary windings to the other output conductor, a different similarly poled rectifier connected in series with each reactance winding, means for supplying a unidirectional voltage of adjustable magnitude and reversible polarity to said saturation control means, said saturation control means being arranged to have opposite instantaneous magnetic saturation effect upon the reactance windings that conduct during the same half-cycle of source voltage, and the reactance windings of each said first and second pairs of reactance windings being arranged to have oppositely directed magnetic coupling with said saturation control means during their respective alternately conductive periods.

References Cited in the file of this patent

UNITED STATES PATENTS

| | | |
|---|---|---|
| Re. 16,667 | Hewlett et al. | July 5, 1927 |
| 2,027,311 | Fitzgerald | Jan. 7, 1936 |
| 2,126,790 | Logan | Aug. 16, 1938 |
| 2,399,872 | Krussfmann | May 7, 1946 |
| 2,414,936 | Edwards et al. | Jan. 28, 1947 |
| 2,475,575 | Tweedy | July 5, 1949 |
| 2,477,729 | Fitzgerald | Aug. 2, 1949 |
| 2,504,675 | Forssell | Apr. 18, 1950 |

FOREIGN PATENTS

| | | |
|---|---|---|
| 224,992 | Switzerland | Jan. 28, 1947 |
| 233,014 | Switzerland | Oct. 2, 1944 |
| 233,962 | Switzerland | Dec. 1, 1944 |
| 894,702 | France | Mar. 20, 1944 |

OTHER REFERENCES

Publication, "Magnetic Amplifiers," published by Vickers, Inc, 1949.